(12) United States Patent
Jian

(10) Patent No.: US 12,285,934 B2
(45) Date of Patent: Apr. 29, 2025

(54) SELF-ADHESIVE CORK WALLPAPER

(71) Applicant: Shenzhen Owl Legend Technology CO., Ltd., Shenzhen (CN)

(72) Inventor: Moqiang Jian, Dongguan (CN)

(73) Assignee: Shenzhen Owl Legend Technology CO., Ltd., Shenzhen (CN)

(*) Notice: Subject to any disclaimer, the term of this patent is extended or adjusted under 35 U.S.C. 154(b) by 84 days.

(21) Appl. No.: 18/485,253

(22) Filed: Oct. 11, 2023

(65) Prior Publication Data

US 2025/0074033 A1 Mar. 6, 2025

(30) Foreign Application Priority Data

Sep. 5, 2023 (CN) .......................... 202322399407.3

(51) Int. Cl.
*B32B 9/02* (2006.01)
*B32B 3/30* (2006.01)
(Continued)

(52) U.S. Cl.
CPC .................. *B32B 9/02* (2013.01); *B32B 3/30* (2013.01); *B32B 7/06* (2013.01); *B32B 7/12* (2013.01); *B32B 9/041* (2013.01); *B32B 9/045* (2013.01); *B32B 15/12* (2013.01); *C09J 7/20* (2018.01); *C09J 7/30* (2018.01); *C09J 7/401* (2018.01); *B32B 2255/12* (2013.01); *B32B 2307/409* (2013.01); *B32B 2307/748* (2013.01); *B32B 2405/00* (2013.01); *B32B 2607/02* (2013.01); *C09J 2400/20* (2013.01); *C09J 2400/28* (2013.01)

(58) Field of Classification Search
CPC .... B32B 9/02; B32B 3/30; B32B 7/06; B32B 7/12; B32B 9/041; B32B 9/045; B32B 15/12; B32B 2255/12; B32B 2307/409; B32B 2307/748; B32B 2405/00; B32B 2607/02; C09J 7/20; C09J 7/30; C09J 7/401; C09J 2400/20; C09J 2400/28
See application file for complete search history.

(56) References Cited

FOREIGN PATENT DOCUMENTS

| CN | 102001203 A | * | 4/2011 | ........... B29C 59/046 |
|---|---|---|---|---|
| CN | 102172950 A | | 9/2011 | |

(Continued)

OTHER PUBLICATIONS

Machine translation of CN-102001203-A. (Year: 2011).*

(Continued)

*Primary Examiner* — Patricia L. Nordmeyer
(74) *Attorney, Agent, or Firm* — Nitin Kaushik

(57) ABSTRACT

The present invention provides a self-adhesive cork wallpaper, comprising a cork layer, wherein the bottom of the cork layer is bonded with a radiance layer via a glue layer, the bottom of the radiance layer is bonded with a base paper layer, the bottom of the base paper layer is painted with a self-adhesive layer, and the bottom of the self-adhesive layer is bonded with a release paper layer, wherein the cork layer of the self-adhesive cork wallpaper imparts a unique texture to the wallpaper, and brings about a distinctive wall surface decoration effect via tactile sensation and visual effect; and the natural texture of the cork material imparts a natural aesthetic feeling to the wallpaper, and increases the warmth and comfort of an indoor space.

6 Claims, 4 Drawing Sheets

(51) Int. Cl.
*B32B 7/06* (2019.01)
*B32B 7/12* (2006.01)
*B32B 9/04* (2006.01)
*B32B 15/12* (2006.01)
*C09J 7/20* (2018.01)
*C09J 7/30* (2018.01)
*C09J 7/40* (2018.01)

(56) References Cited

FOREIGN PATENT DOCUMENTS

| | | | | |
|---|---|---|---|---|
| CN | 113308942 A | 8/2021 | | |
| CN | 213861190 U | 8/2021 | | |
| CN | 216891764 U | 7/2022 | | |
| KR | 200396921 Y1 * | 9/2005 | | |
| KR | 100790580 B1 * | 1/2008 | | |
| PT | 105136 A * | 11/2011 | | |
| WO | WO-2011082491 A1 * | 7/2011 | ............. | B32B 21/06 |
| WO | WO-2011149370 A1 * | 12/2011 | ............. | A63B 41/08 |
| WO | WO-2020020547 A1 * | 1/2020 | ............. | B32B 15/06 |

OTHER PUBLICATIONS

Machine translation of KR-100790580-B1 (Year: 2008).*
Machine translation of KR-200396921-Y1 (Year: 2005).*
Machine translation of PT-105136-A (Year: 2011).*
Machine translation of WO-2020020547-A1. (Year: 2020).*

* cited by examiner

SELF-ADHESIVE CORK WALLPAPER

CROSS-REFERENCE TO RELATED APPLICATIONS

The application claims priority to Chinese patent application No. 2023223994073, filed on Sep. 5, 2023, the entire contents of which are incorporated herein by reference.

TECHNICAL FIELD

The present invention relates to the technical field of wallpaper, in particular self-adhesive cork wallpaper.

BACKGROUND

Conventional wallpaper is usually made of paper or plastic material, which, although different in appearance, lacks unique texture and visual effects. People began to explore new materials and technologies in order to create more varied wall decoration effects. Cork, as a natural, environment-friendly, and unique texture material, has attracted more and more attention.

Currently, some wallpaper products using cork materials have appeared on the market, however, these products still have limitations in texture and visual effects. In order to improve the decorative effect of cork wallpaper, it is practical to develop an innovative self-adhesive cork wallpaper with a radiant effect.

SUMMARY

It is an object of the present invention to provide a self-adhesive cork wallpaper that solves many of the problems set forth in the above background art.

In order to achieve the above object, the present invention provides the following technical solutions: a self-adhesive cork wallpaper, comprising a cork layer, wherein the bottom of the cork layer is bonded with a radiance layer via a glue layer, the bottom of the radiance layer is bonded with a base paper layer, the bottom of the base paper layer is painted with a self-adhesive layer, and the bottom of the self-adhesive layer is bonded with a release paper layer.

As a preferred embodiment of the present invention: a textured hollowed-out groove is provided on the surface of the cork layer bonded to the radiance layer.

As a preferred embodiment of the present invention: the radiance layer is a metal film layer or a pearlescent material layer.

As a preferred embodiment of the present invention: the base paper layer is a color painting printing paper or a plastic paper.

As a preferred embodiment of the present invention: the release paper layer is a kraft paper or a release film.

As a preferred embodiment of the present invention: the cork layer, the glue layer, the radiance layer, the base paper layer, and the self-adhesive layer are integrally formed structures.

Compared to the prior art, the advantageous effects of the present invention are:

1) wherein the cork layer of the self-adhesive cork wallpaper imparts a unique texture to the wallpaper, and brings about a distinctive wall surface decoration effect via tactile sensation and visual effect; and the natural texture of the cork material imparts a natural aesthetic feeling to the wallpaper, and increases the warmth and comfort of an indoor space, and the provided radiance layer makes the surface of the wallpaper have a mottled metal texture or pearlescent powder material texture, and produces a unique light and shadow effect through the refraction and reflection of light; the hollowed-out groove on the surface of the wallpaper increases the three-dimensional feeling and hierarchical feeling, which makes the wall decoration more diversified; the self-adhesive layer at the bottom of the wallpaper enables it to be conveniently adhered to the wall surface without additional glue or tools; the self-adhesive layer has good adhesion properties, so that the installation of the wallpaper is more simple and quick;

2) as a natural material, the self-adhesive cork wallpaper cork is non-toxic and harmless and does not release harmful substances. The cork material also has the characteristics of constant temperature, natural, recyclable, and renewable, and is an environmentally friendly decorative material. In the production process of wallpaper, environmental protection glue layer and color painting printing paper are used to ensure the environmental protection performance of the wallpaper itself. The addition of cork makes wallpaper also have the function of natural constant temperature, sound insulation, and thermal insulation. This self-adhesive cork wallpaper is in line with modern people's pursuit of environmental protection and a healthy home and has better practicality.

In the FIG.: 1. cork layer; 11. hollowed-out groove; 2. glue layer; 3. radiance layer; 31. metal film layer; 32. pearlescent material layer; 4. base paper layer; 41. color painting printing paper; 42. plastic paper; 5. self-adhesive layer; 6. release paper layer; 61. kraft paper; 62. release film.

DETAILED DESCRIPTION OF THE EMBODIMENTS

The embodiments of the present invention will now be described more fully hereinafter with reference to the accompanying drawings, in which embodiments of the invention are shown. It is to be understood that the embodiments described are only a few, but not all embodiments of the invention. Based on the embodiments of the present invention, all other embodiments obtained by a person of ordinary skill in the art without inventive effort fall within the scope of the present invention.

Figure 1:
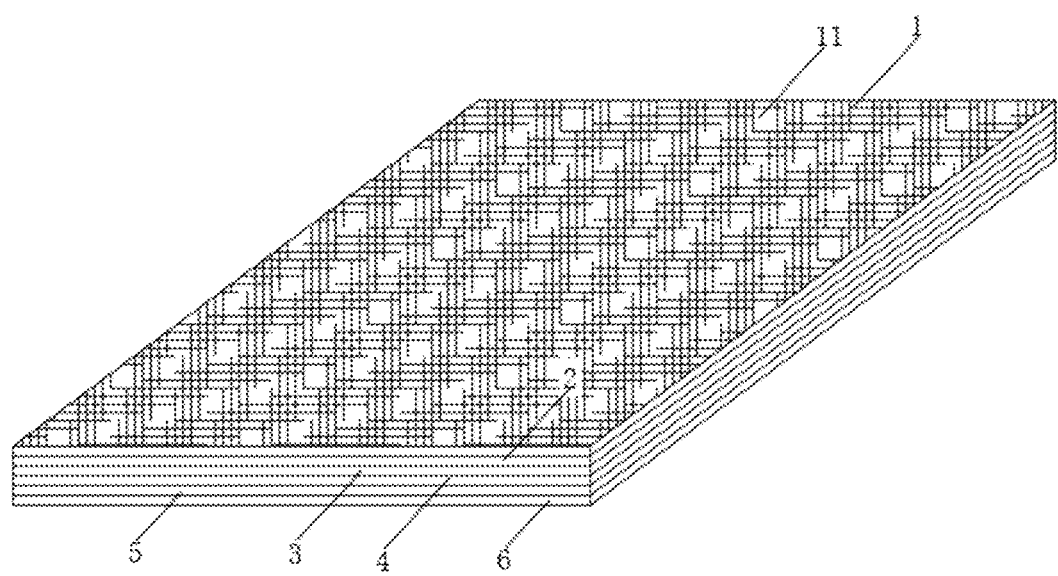
FIG. 1 is a schematic view showing the structure of the present invention.
Figure 2:
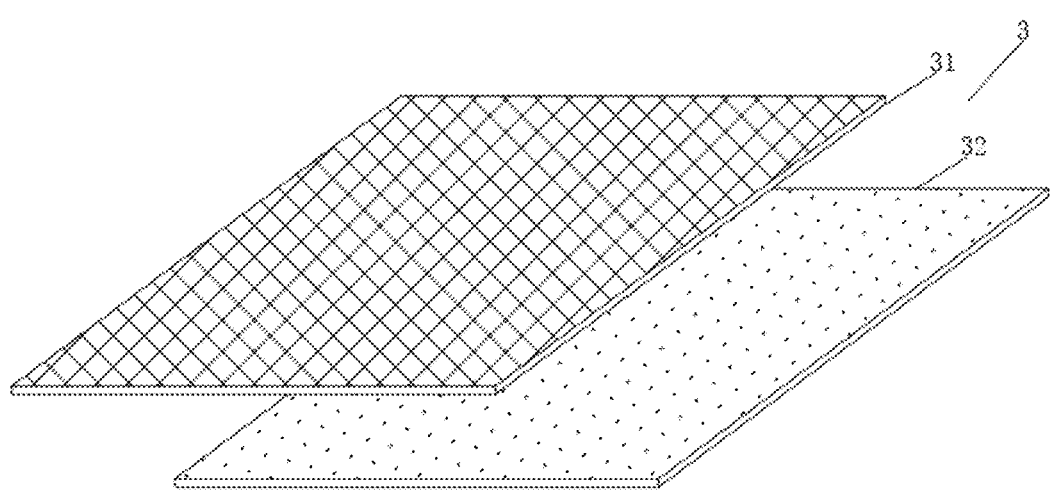
FIG. 2 is a schematic view showing the structure of a radiance layer according to the present invention.
Figure 3:
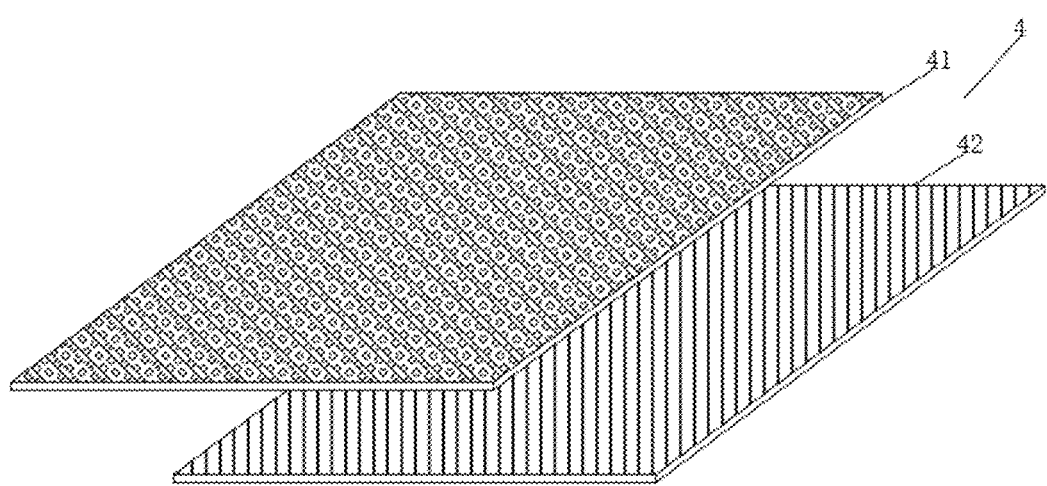
FIG. 3 is a schematic view showing the structure of a base paper layer according to the present invention.
Figure 4:
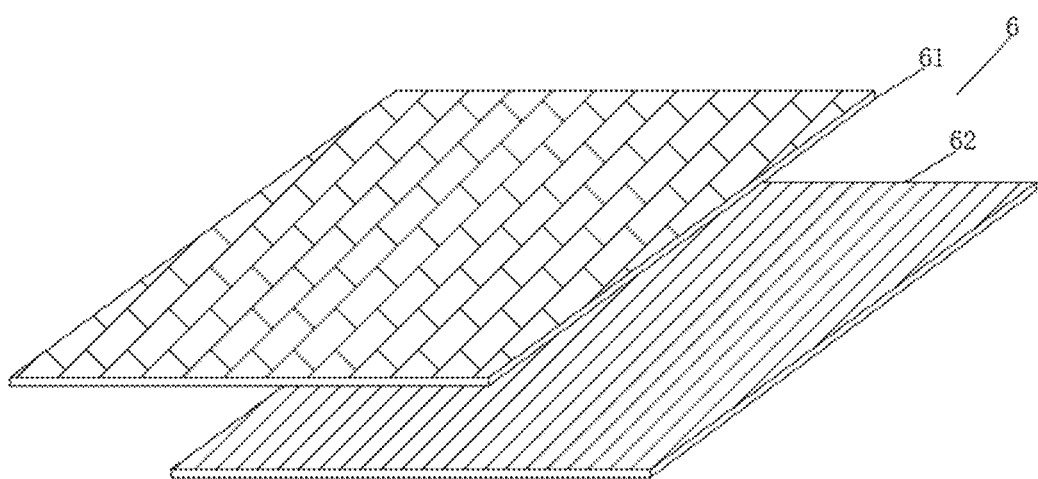
FIG. 4 is a schematic view showing the structure of a release paper layer according to the present invention.

With reference to FIGS. 1-4, the present invention provides a technical solution: A self-adhesive cork wallpaper, comprising a cork layer 1, wherein the bottom of the cork layer 1 is bonded with a radiance layer 3 via a glue layer 2, the bottom of the radiance layer 3 is bonded with a base paper layer 4, the bottom of the base paper layer 4 is painted with a self-adhesive layer 5, and the bottom of the self-adhesive layer 5 is bonded with a release paper layer 6.

Specifically, the wallpaper is processed by the integrated forming method of the cork layer 1, the glue layer 2, the radiance layer 3, the base paper layer 4 and the self-adhesive layer 5, and by selecting different corks, the wallpaper can present different wood grain lines and give the wallpaper a unique texture, and bring a distinctive wall surface decorative effect through the touch and visual effect, while the radiance layer 3 provides the wallpaper surface with a mottled metallic texture or pearlescent powder material texture, and generates a unique light and shadow effect through the refraction and reflection of light, and the hollowed-out groove 11 on the wallpaper surface increases the three-dimensional feeling and the layered feeling. The decoration of the wall surface is more diversified, and the base paper layer 4 and the self-adhesive layer 5 are provided so that the wallpaper can be conveniently bonded to the wall surface to facilitate the posting and paving of the wallpaper, and the release paper layer 6 can protect the self-adhesive layer 5 to prevent the wallpaper from being damaged when the self-adhesive layer 5 is not used.

In the example: a textured hollowed-out groove 11 is provided on the surface of the cork layer 1 bonded to the radiance layer 3.

Specifically, by providing the hollowed-out groove 11, the radiance layer 3 can penetrate the cork layer 1 to produce a glowing effect, and the newspaper wallpaper has a better decoration.

In the example: the radiance layer 3 is a metal film layer 31 or a pearlescent material layer 32.

Specifically, when the metal film layer 31 is selected as the radiance layer 3, the surface of the wallpaper can have a mottled metal texture, and when the pearlescent material layer 32 is selected as the radiance layer 3, the surface of the wallpaper can have a mottled pearl texture.

In the example: the base paper layer 4 is a color painting printing paper 41 or a plastic paper 42.

Specifically, by selecting the color painting printing paper 41 as the base paper layer 4, the wallpaper is made more environmentally friendly and degradable, so as to ensure the environmental protection of the wallpaper; by selecting the plastic paper 42 as the base paper layer 4, the wallpaper has a stronger structural strength, and can also increase the waterproof and dustproof effects of the wallpaper.

In the example: the release paper layer 6 is a kraft paper 61 or a release film 62.

Specifically, the self-adhesive layer 5 can be protected by the kraft paper 61 or the release film 62, so that the wallpaper can be flexibly selected according to the processing requirements.

Should also be noted that The cork material selected for wallpaper has better durability and compression resistance, so the wallpaper has a longer service life. At the same time, cork wallpaper also has a certain sound insulation and thermal insulation effect, further enhancing the comfort of indoor space.

What is not described in detail in this description belongs to the prior art known to those skilled in the art. Although the present invention has been described in detail with reference to the foregoing embodiments, it will be apparent to those skilled in the art that various changes may be made in the embodiments described above, and equivalents may be substituted for elements thereof. Thus, it is intended that the present invention cover the modifications and variations of this invention provided they come within the scope of the appended claims and their equivalents.

What is claimed is:

1. A self-adhesive cork wallpaper, comprising a cork layer (1), wherein the bottom of the cork layer (1) is bonded with a radiance layer (3) via a glue layer (2), the bottom of the radiance layer (3) is bonded with a base paper layer (4), the bottom of the base paper layer (4) is painted with a self-adhesive layer (5), and the bottom of the self-adhesive layer (5) is bonded with a release paper layer (6).

2. The self-adhesive cork wallpaper of claim 1, wherein a textured hollowed-out groove (11) is provided on the surface of the cork layer (1) bonded to the radiance layer (3).

3. The self-adhesive cork wallpaper of claim 1, wherein the radiance layer (3) is a metal film layer (31) or a pearlescent material layer (32).

4. The self-adhesive cork wallpaper of claim 1, wherein the base paper layer (4) is a color painting printing paper (41) or a plastic paper (42).

5. The self-adhesive cork wallpaper of claim 1, wherein the release paper layer (6) is a kraft paper (61) or a release film (62).

6. The self-adhesive cork wallpaper of claim 1, wherein the cork layer (1), the glue layer (2), the radiance layer (3), the base paper layer (4), and the self-adhesive layer (5) are integrally formed structures.

* * * * *